(12) United States Patent
Wu

(10) Patent No.: US 6,536,361 B1
(45) Date of Patent: Mar. 25, 2003

(54) COMBINABLE PLANTING PLATE

(76) Inventor: Tung-Yuan Wu, No. 37, Lane 333, Chung Te Rd., Tainan (TW)

(*) Notice: Subject to any disclaimer, the term of this patent is extended or adjusted under 35 U.S.C. 154(b) by 0 days.

(21) Appl. No.: 09/972,973

(22) Filed: Oct. 10, 2001

(51) Int. Cl.⁷ ............................................. A01C 11/00
(52) U.S. Cl. ........................ 111/114; 111/901; 47/86
(58) Field of Search ................................ 111/100, 114, 111/101, 103, 109, 200, 901; 47/74, 86

(56) References Cited

U.S. PATENT DOCUMENTS

| | | | | |
|---|---|---|---|---|
| 3,722,137 A | * | 3/1973 | Kesinger et al. |
| 3,755,964 A | * | 9/1973 | Rack |
| 4,023,506 A | * | 5/1977 | Robey |
| 4,611,428 A | * | 9/1986 | Hakli |
| 4,658,542 A | * | 4/1987 | Holmberg |
| 4,918,863 A | * | 4/1990 | Youssef |
| 5,274,951 A | * | 1/1994 | Besing |
| 5,309,846 A | * | 5/1994 | Peterson |
| 5,315,786 A | * | 5/1994 | Smith et al. |
| 5,400,544 A | * | 3/1995 | Wien |
| 5,410,840 A | * | 5/1995 | Loesken |
| 5,664,370 A | * | 9/1997 | Boudreau et al. |
| 5,983,566 A | * | 11/1999 | Enderlein et al. |
| 6,314,679 B1 | * | 11/2001 | White |

FOREIGN PATENT DOCUMENTS

| | | | |
|---|---|---|---|
| JP | 10-248416 | * | 9/1998 |
| JP | 2001-207455 | * | 8/2001 |

* cited by examiner

Primary Examiner—Victor Batson
(74) Attorney, Agent, or Firm—Rosenberg, Klein & Lee

(57) ABSTRACT

A combinable planting plate includes a base, a support plate and a planting layer. The base has a plurality of cup-shaped chambers or cone-shaped projections for storing water. The base has a plurality of square rings and combining studs on its circumferential edge to combine more than two bases together to increase a planting area as needed. The support plate is combined on the base, possible to be a flat net plate or a plate with a plurality of cone-shaped projections for storing water-absorbing material. The support plate has a circumferential short wall for receiving the plating layer therein for planting lawn, flowers, evergreens, etc. according to a person's taste and liking.

8 Claims, 20 Drawing Sheets

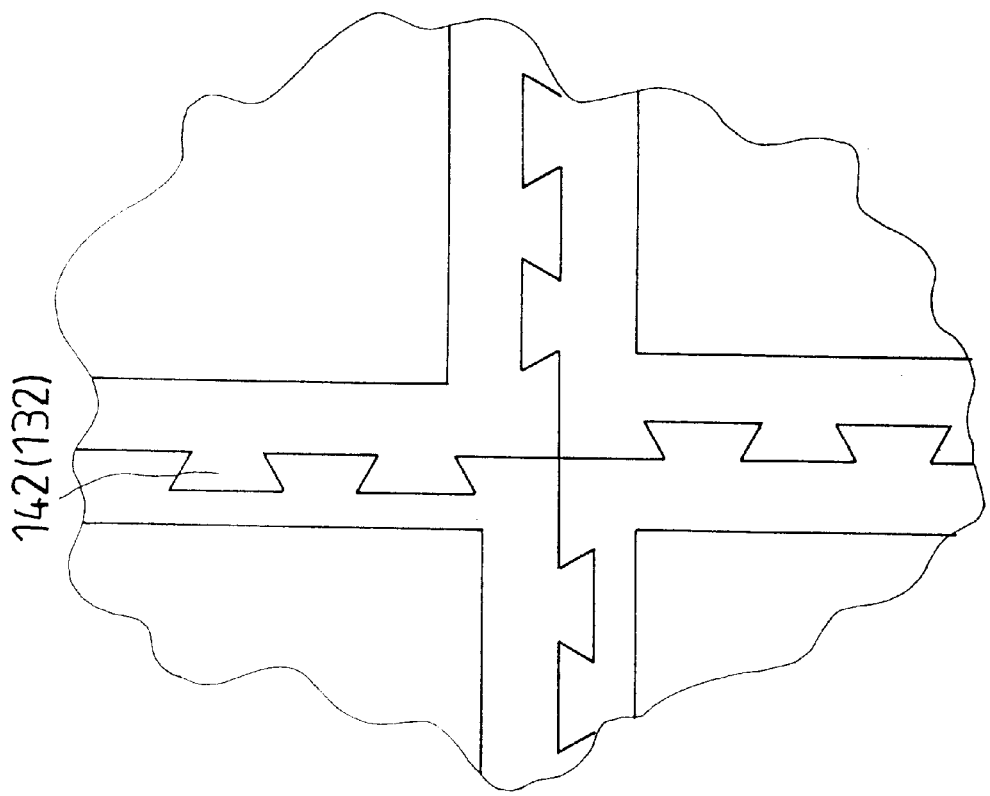
F I G. 17
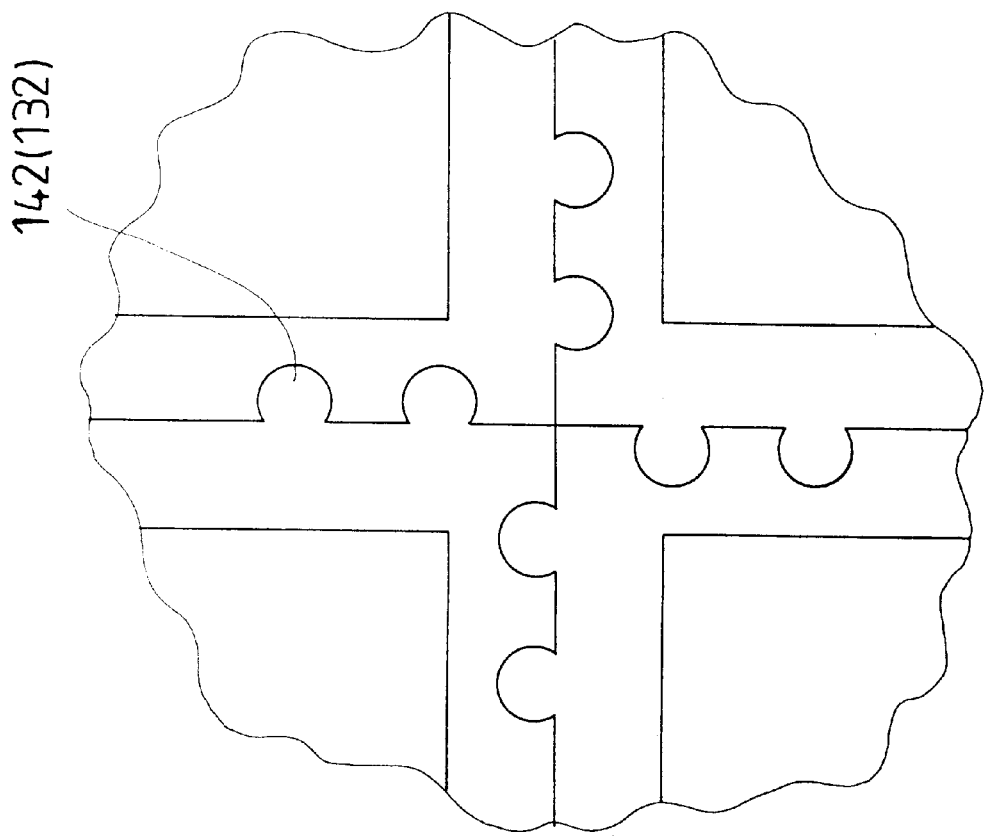
F I G. 16

COMBINABLE PLANTING PLATE

BACKGROUND OF THE INVENTION

This invention relates to a combinable planting plate, particularly to one easy to fabricate, combinable to different areas a person wants, possible to plant different sorts of plants, adjustable in water volume contained in a planting layer placed in the planting plate.

As population and cities incessantly grow, and spare land for green area is harder and harder to find. Ordinary people living in a jungle of concrete buildings can only make use of a small space for planting some trees, flowers or green lawn for enjoying and observation, cultivating some lawn on a rooftop or arranging some pot flowers and evergreens, etc. in a house. However, those pot flowers or lawns on rooftops have the following disadvantages and inconveniences.

1. In planting lawns a layer of non-woven cloth is laid on the ground, or a layer of hollow bricks is laid under the layer of non-woven cloth additionally. Then soil is placed on the non-woven cloth for cultivating lawn or flowers in the soil, but this kind of planting is rather suitable for a large area, not suitable for a small room in a house or a small space of outer empty land around a house.
2. As soil is to be brought into a house and laid on a non-woven cloth, it may smear some places in a house during carrying the soil, involving cleaning work of scattered soil.
3. Common lawn is in advance already cultivated and then transplanted to where it is needed, so after the lawn is finished planting, it is not easy to change or supplement other flowers
4. Soil for lawn or green grass cannot hold water always enough, so it has to be watered regularly, resulting in psychological and bodily burden to a person.

SUMMARY OF THE INVENTION

A main objective of the invention is to offer a combinable planting plate consisting of a base, a support plate and a planting layer. The base has a plurality of cup-shaped chambers for storing water, or cone-shaped projections to store water in the spaces among the cone-shaped projections. The base has a plurality of projecting square rings and projecting combining studs formed on a circumferential edge for combining more than two bases to increase a planting area. Further, a support plate or a flat net plate is combined on the base, having a plurality of cone-shaped cups with water-absorbing material contained therein for adjusting water volume. The support plate has a circumferential short wall for placing a planting layer in the space surrounded by the wall. Then lawn, green grass or flowers may be planted in the planting layer according to a person' liking, Another objective of the invention is to offer a combinable planting plate provided with a support plate, which has a plurality of cone-shaped projections and water-absorbing material contained in each cone-shaped projection for planting moisture-enduring plants. Or the theory of siphon can be used to suck water in the projections to the planting layer to plant dry-enduring plants to prevent water from flowing excessively. Thus, water in the planting layer can be adjustable, facilitating care of the plants in conjunction with water storing function of the cup-shaped chambers of the base.

One more objective of the invention is to offer a combinable planting plate, having the base and the supporting plate placed on the base to permit rain or water sprayed to flow through the drain holes of the supporting plate or through the net plate into the cone-shaped cups of the base to store therein. Further, the base has drain holes in a proper height to adjust the water level of the base, which then has a function of storing water. If the flat net plate is used, roots of lawn or flowers can extend down through the net holes to suck up water stored in the base, without possibility of withering caused by insufficiency of water.

BRIEF DESCRIPTION OF THE DRAWINGS

This invention will be better understood by referring to the accompanying drawings, wherein:

FIG. 16 is a first upper view of the fitting structure of a base of the second embodiment of the present invention.

FIG. 17 is a second perspective view of the fitting structure of the second embodiment of a base of the present invention.

DETAILED DESCRIPTION OF THE PREFERRED EMBODIMENTS

Figure 1:
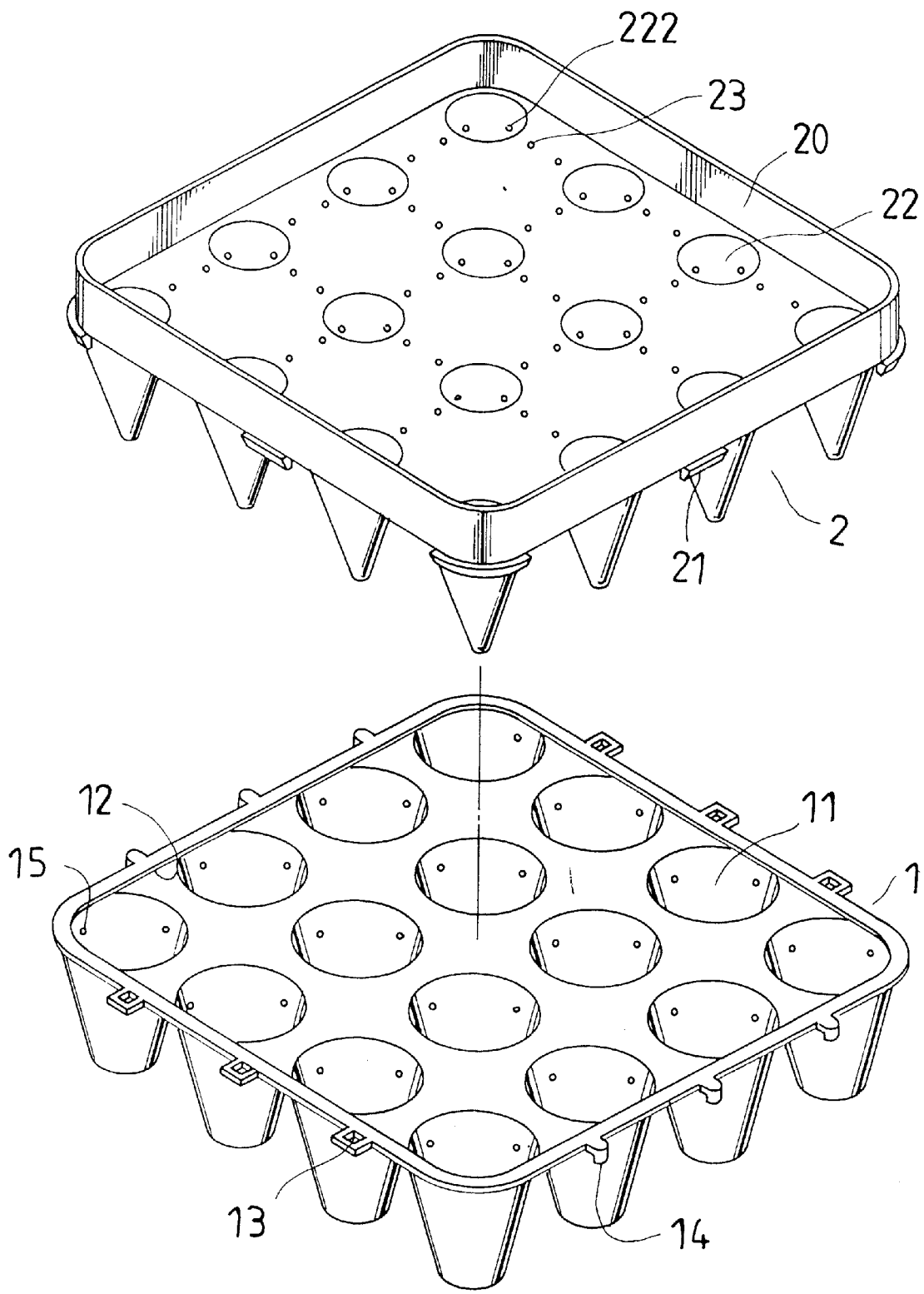
FIG. 1 is an exploded perspective view of a first embodiment of a combinable planting plate of the present invention.
Figure 2:
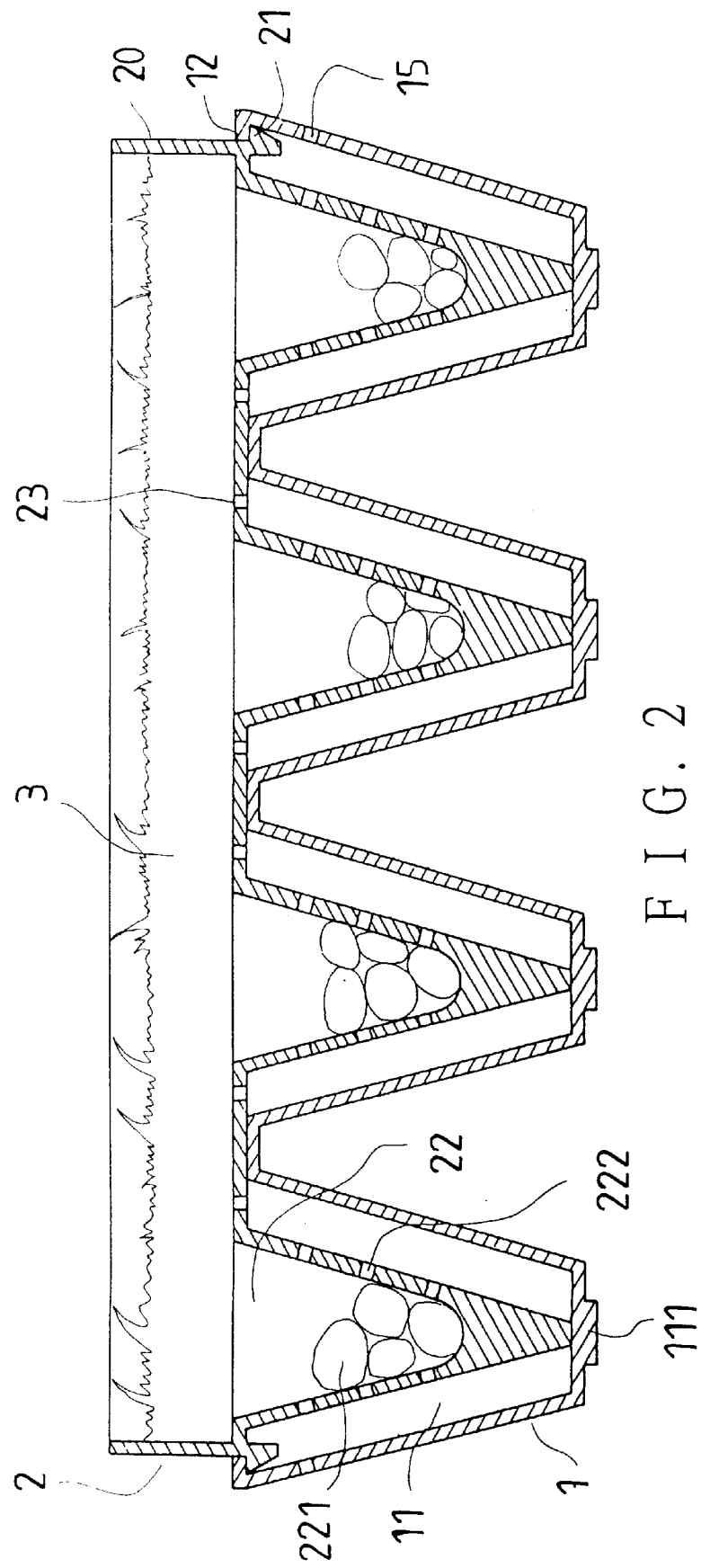
FIG. 2 is a cross-sectional view of the first embodiment of a combinable planting plate of the present invention.
Figure 3:
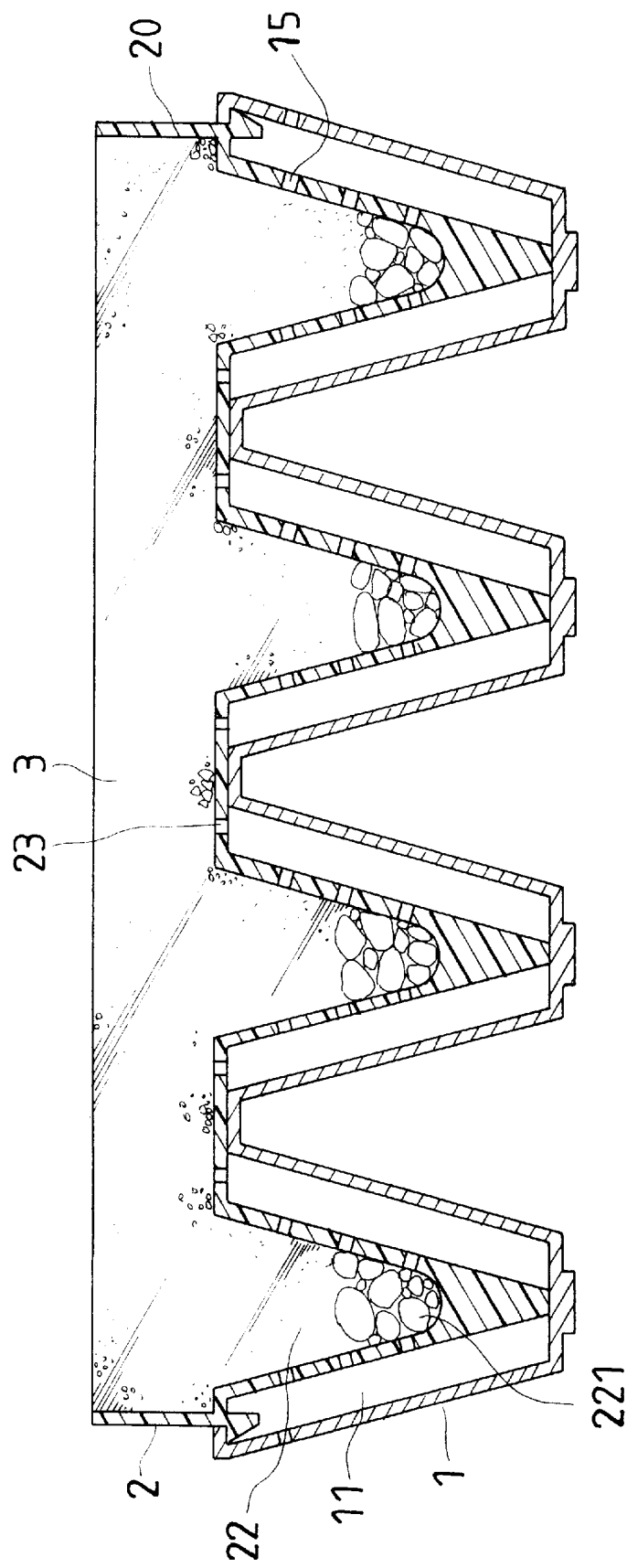
FIG. 3 is a cross-sectional view of the first embodiment of a combinable planting plate being practically used in the present invention.

A first embodiment of a combinable planting plate in the present invention, as shown in FIGS. 1 and 2, includes a base 1, a supporting plate 2 and a planting layer 3 combined together.

The base 1 has a preset size, a plurality of cup-shaped chambers 11 formed regularly in its interior and extending down from its upper surface. Each cup-shaped chamber 11 has a thick bottom block 111 formed in the bottom center, and a plurality of insert edges 12 and projecting square rings 13 and projecting studs 14 are formed spaced apart in a circumferential edge of the base 1 to permitting two bases 1 combined side by side by means of the projecting studs 14 fitting in the relative projecting square rings 13. Further, the base 1 has a plurality of drain holes 15 formed in an upper portion of the circumferential wall for excessive water to drain out.

The support plate 2 has the corresponding size to the base 1 so as to combine on the base 1, having a circumferential short wall 20 and insert blocks 21 formed at relative locations of the insert edges 12 of the base to stable the support plate 2 on the base by mean of the insert blocks inserting in the insert edges 12 after the support plate is placed on the base 1. Further, the support plate 2 has a plurality of cone-shaped cups 22 regularly formed in its interior and extending down to insert in the cup-shaped chambers 11 of the base 1, with the bottom of each cup 22 resting on the insert bottom block 111 of the relative chamber 11. Further, each cone-shaped cup 22 has water-absorbing material 221 deposited in its interior, and some drain holes 222 for draining excessive water and at the same time supplying water to the upper plating layer 3 according to the theory of the siphon and thus adjusting the water volume in the cone-shaped cups 22. In addition, the support plate also has a plurality of insert holes 23 among the cone-shaped cups 22.

The planting layer 3 consists of soils containing growing ingredients for lawn, flowers, evergreens, several mixed materials, laid on the supporting plate 2, for planting green grass, lawn, flowers, evergreens, perennials, etc. Mixed materials for the planting layer 3 may be concocted by mixing soil, wooden waste, or small pebbles, synthetic materials, poly materials, or only non-woven cloth, plant fiber mixed with paper compound materials. Besides, seeds may be mixed in the planting layer 3 in advance.

In combining the planting plate for use, firstly, the support plate is combined with the base 1, by fitting the insert blocks 21 in the insert edges 12. Then the plating layer 3 is deposited on the support plate 2 or soil is directly laid on the support plate 2 to form the planting layer 3, After that necessary numbers of the planting plates are combined together according to the area needed to plant lawn, flowers, evergreens, etc. a person wants, and then the lawn, flowers, evergreens etc. are plated therein.

After lawn, flowers, evergreens, etc are planted in the panting plate 3, they can be sprayed with water, which is then absorbed in the planting layer 3, and excessive water may flow into the cone-shaped cups 22 and absorbed by the absorbing material therein then flow through the drain holes 222 of the cone-shaped cups 22 into the cup-shaped chambers 11 of the base. If water in the chambers 11 is still too much, it will drain out through the drain holes 15. By the way, if dry-enduring plants are planted, water can be absorbed up from the chambers 11 of the base 1 according to the theory of the siphon to the planting plate, preventing water from staying too much therein. In this way, the water in the planting layer 3 may always have proper volume.

Figure 4:
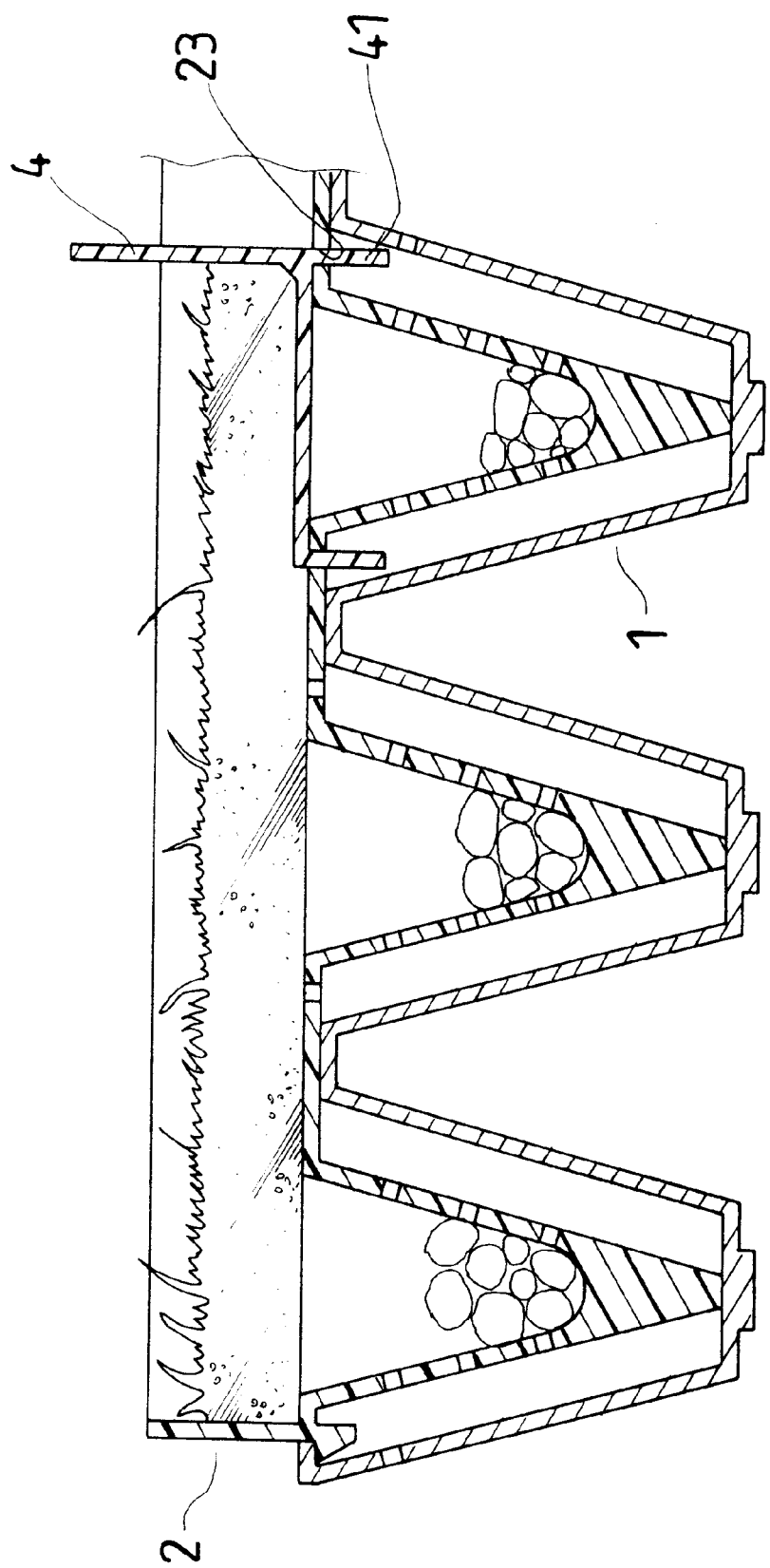
FIG. 4 is a cross-sectional view of the first embodiment of a combinable planting plate with lawn planted of the present invention.

In case that the area of the planting plate does not suit completely to the area needed to plant, as shown in FIG. 4, an excessive part of the planting plate may be cut off and then a separating plate 4 is attached to the cut side of the planting plate, with insert rods 41 formed in the lower end of the separating plate 4 inserted in the insert holes 23 of the support plate 2. Thus the cut side of the planting plate is closed tightly.

Figure 5:
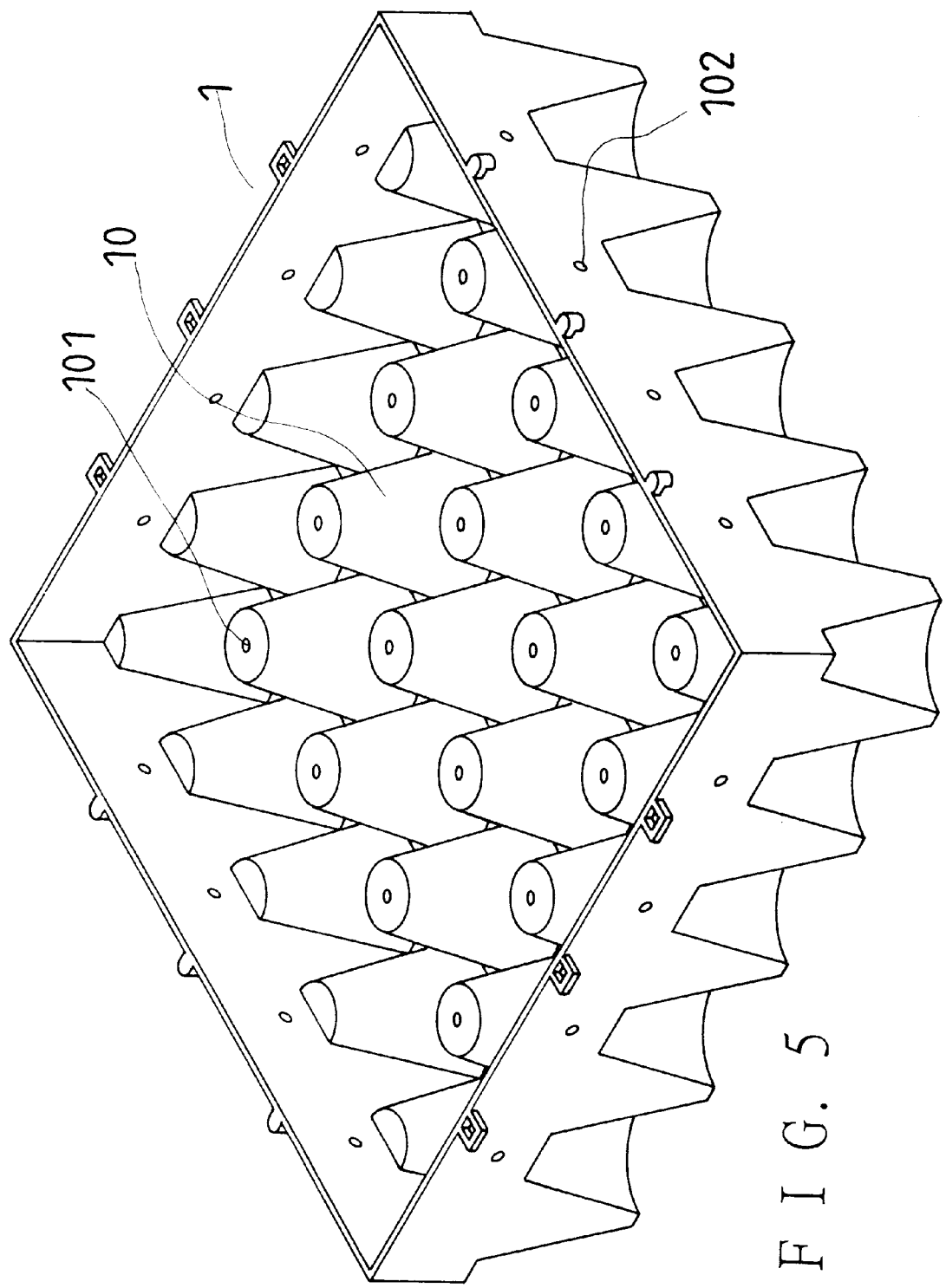
FIG. 5 is a perspective view of the second embodiment of a combinable planting plate of the present invention.
Figure 6:
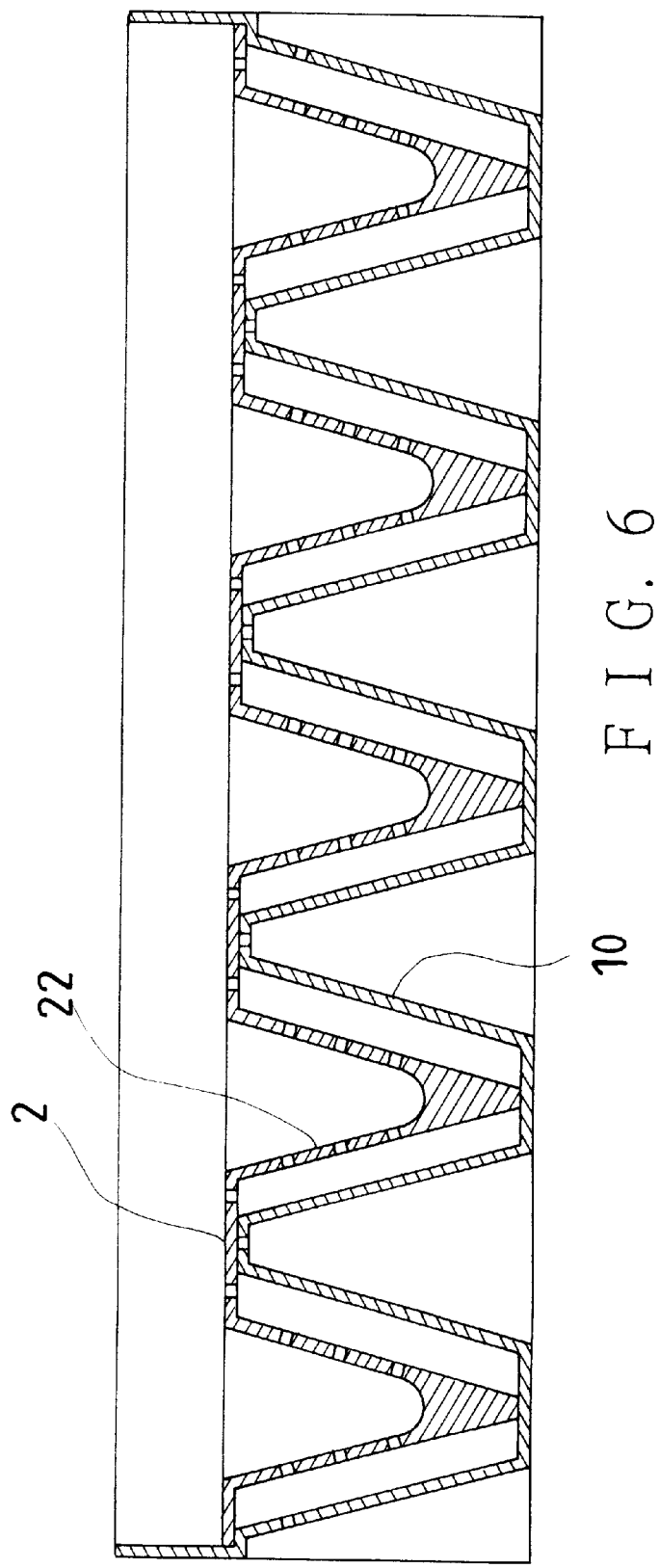
FIG. 6 is a cross-sectional view of the second embodiment of a combinable planting plate of the present invention.

Next, as shown in FIGS. 5 and 6, the base 1 may be made as a U-shaped case with a circumferential short wall, having a plurality of cone-shaped projections 10 like an inverted cup-shaped chamber 11, and forming a water storing space among all the cone-shaped projections 10. Then the cone-shaped cups 22 of the support plate 2 insert in the spaces among the cone-shaped projections 10. Each cone-shaped projection 10 has an upper flat end surface with a drain hole 101, and the base 1 has a plurality of drain holes 102 in an upper portion of the circumferential wall for adjusting the water level in the interior of the base.

Figure 7:
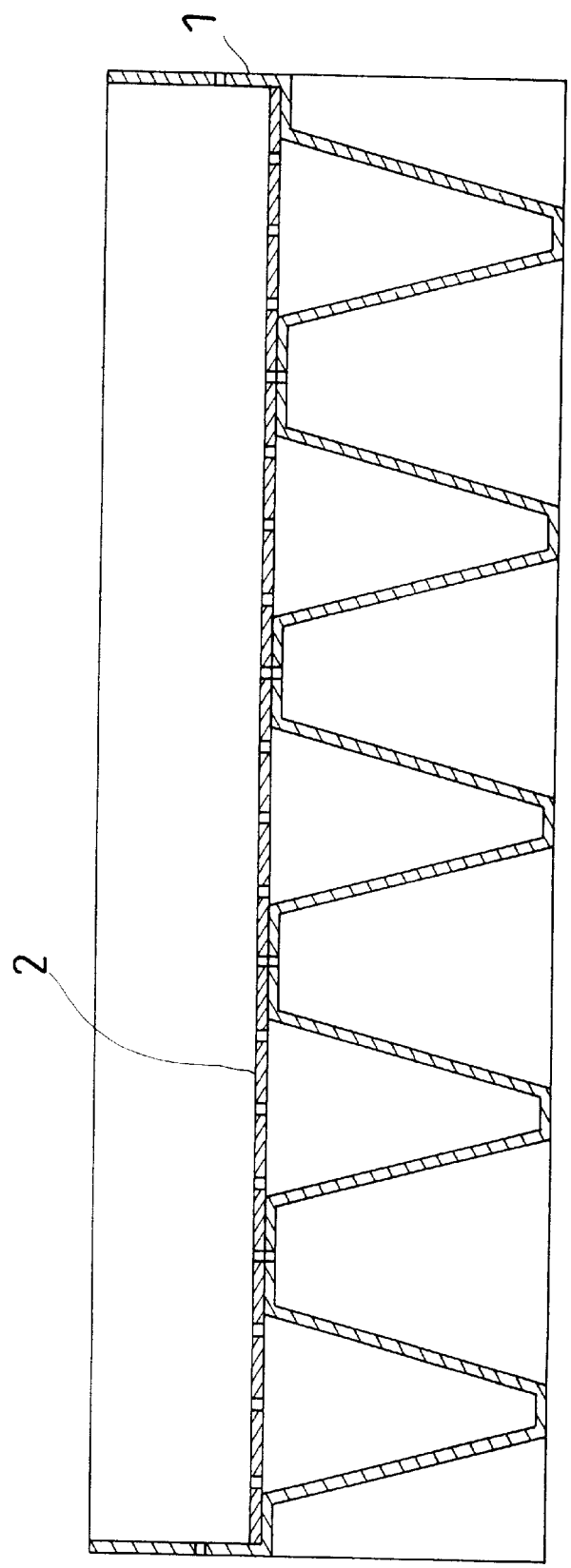
FIG. 7 is a cross-sectional view of a second embodiment of a combinable planting plate of the present invention.

The support plate 2 may be a flat net plate, as shown in FIG. 7, for the planting layer 3 laid thereon, permitting excessive water flow down through the net holes of the support plate 2 to be stored in the base, and for roots of plants to extend through the net holes down to suck up the water in the base 1 so as not to wither.

Figure 8:
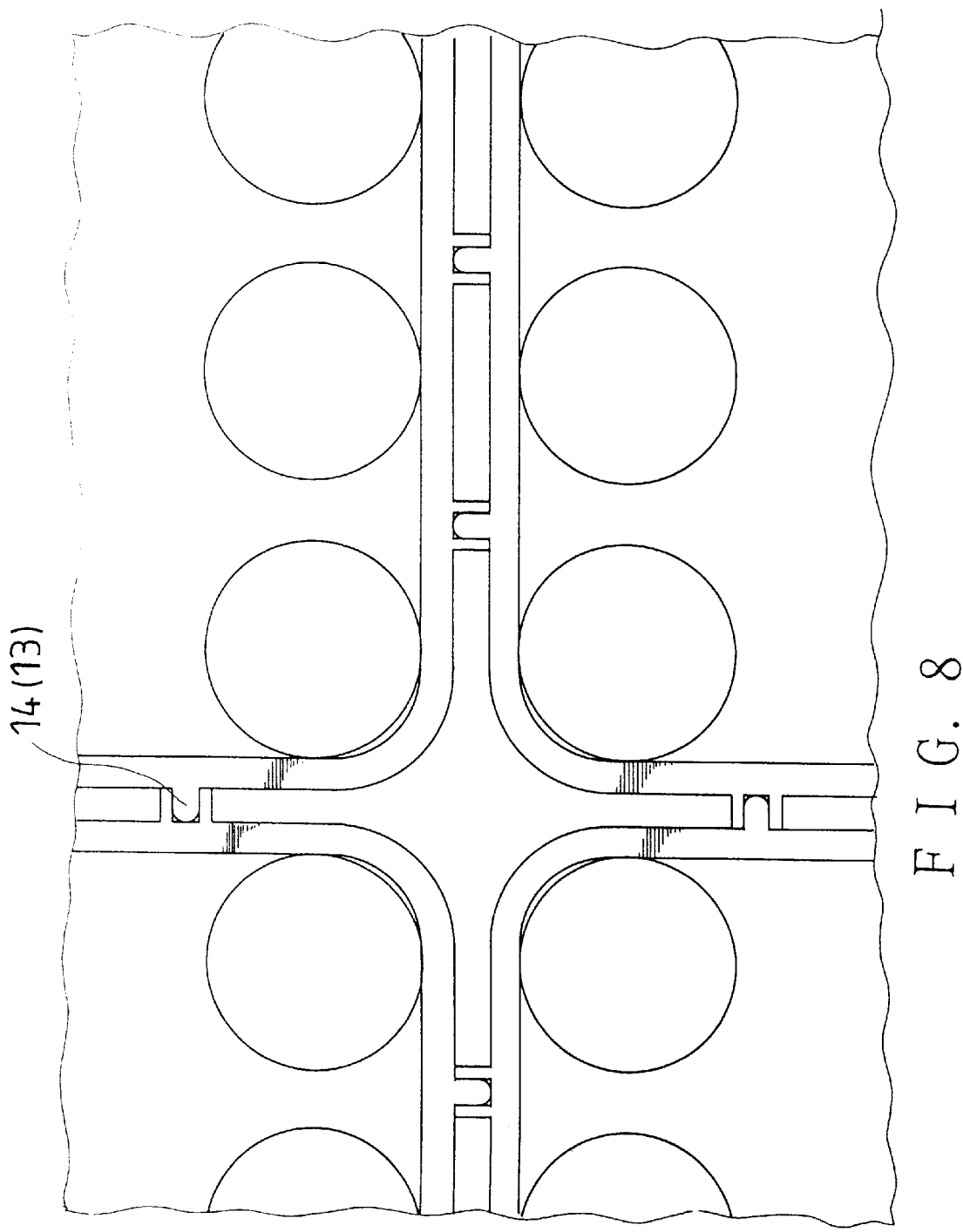
FIG. 8 is an upper view of the first embodiment of a combinable planting plate of the present invention.
Figure 9:
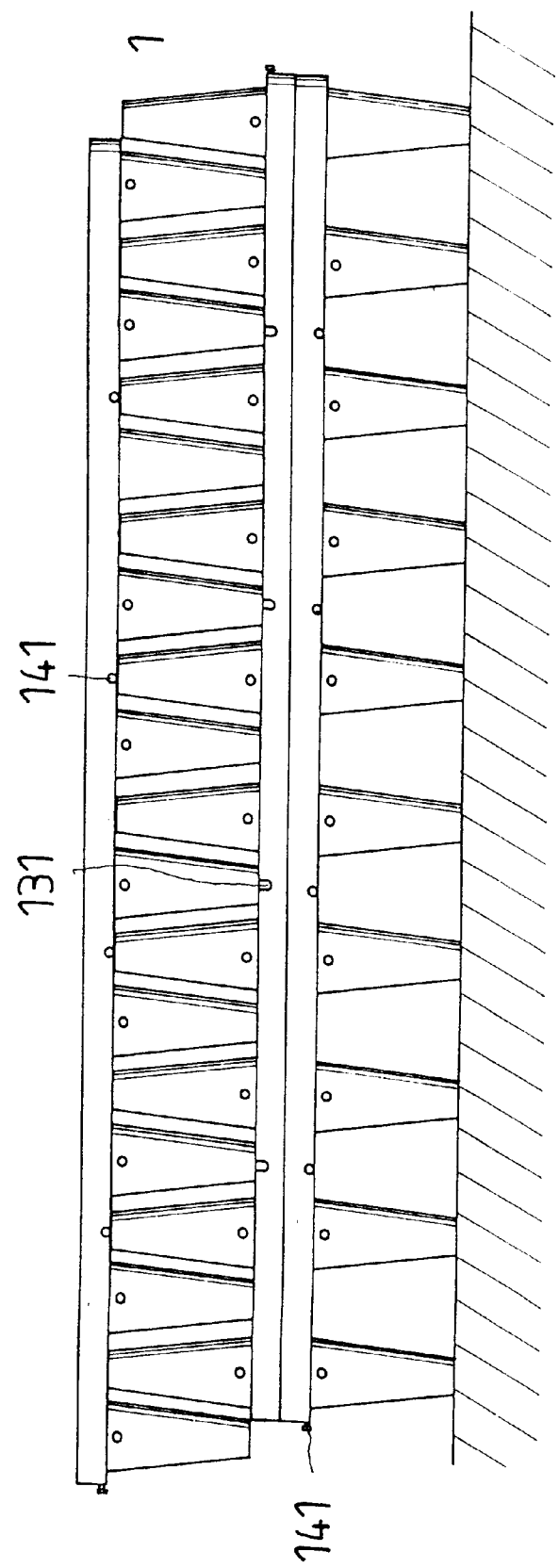
FIG. 9 is a cross-sectional view of a first embodiment of a base of the present invention.
Figure 11:
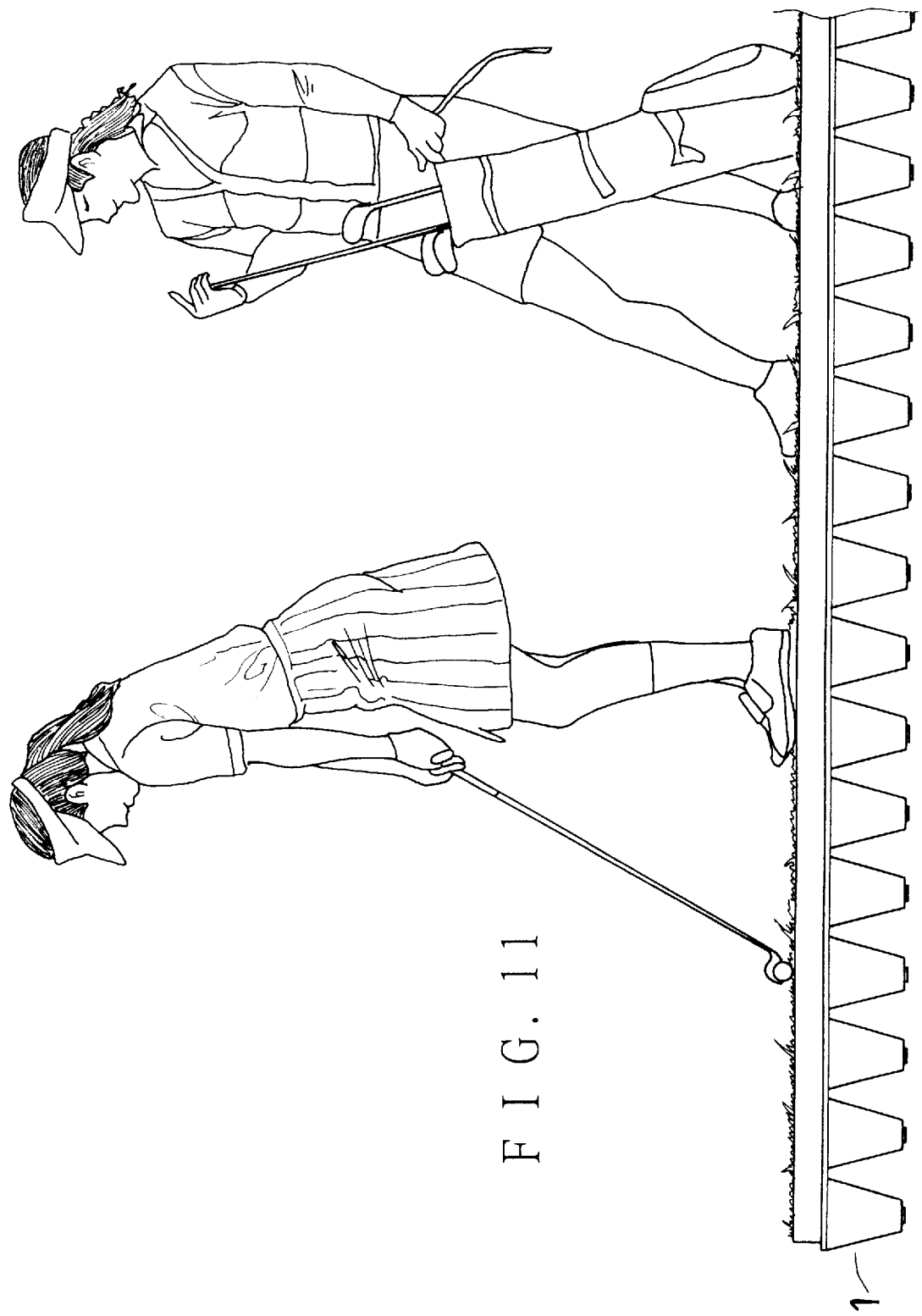
FIG. 11 is a side view of the combinable planting plate practically used in the present invention.

Next, as shown in FIG. 8, several planting plates are combined together by means of the square rings 13 engaging the projecting studs 14 of the base 1 to obtain a necessary area for planting. Or a first embodiment of the base 1 has projecting square ring 13 and a projecting 14 formed to have a notch 131 and a combining rod 141 having a head larger than the notch 131. Then the projecting studs 141 engage the notches 131 to combine the bases 1 one by one to the necessary area, and at the same time the bases 1 can be transported by inverting them and piled up together, as shown in FIG. 9, reducing the dimensions of the planting plates to be transported. Further, a small golf link may be formed by using the planting plates combined on the roof of house as shown in FIG. 11.

Figure 10:
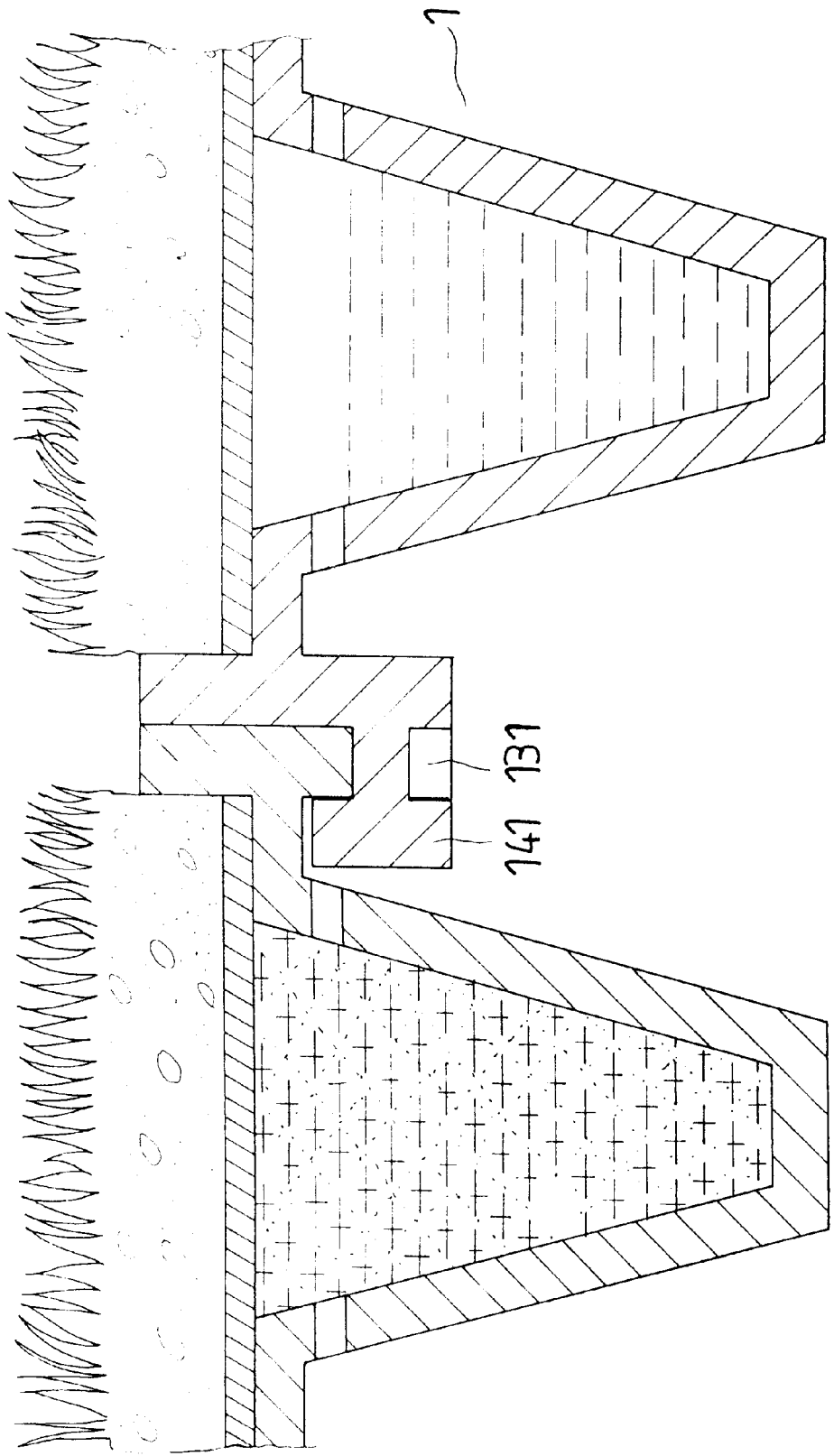
FIG. 10 is a partial cross-sectional view of the first embodiment of a base planted with lawn of the present invention.
Figure 12:
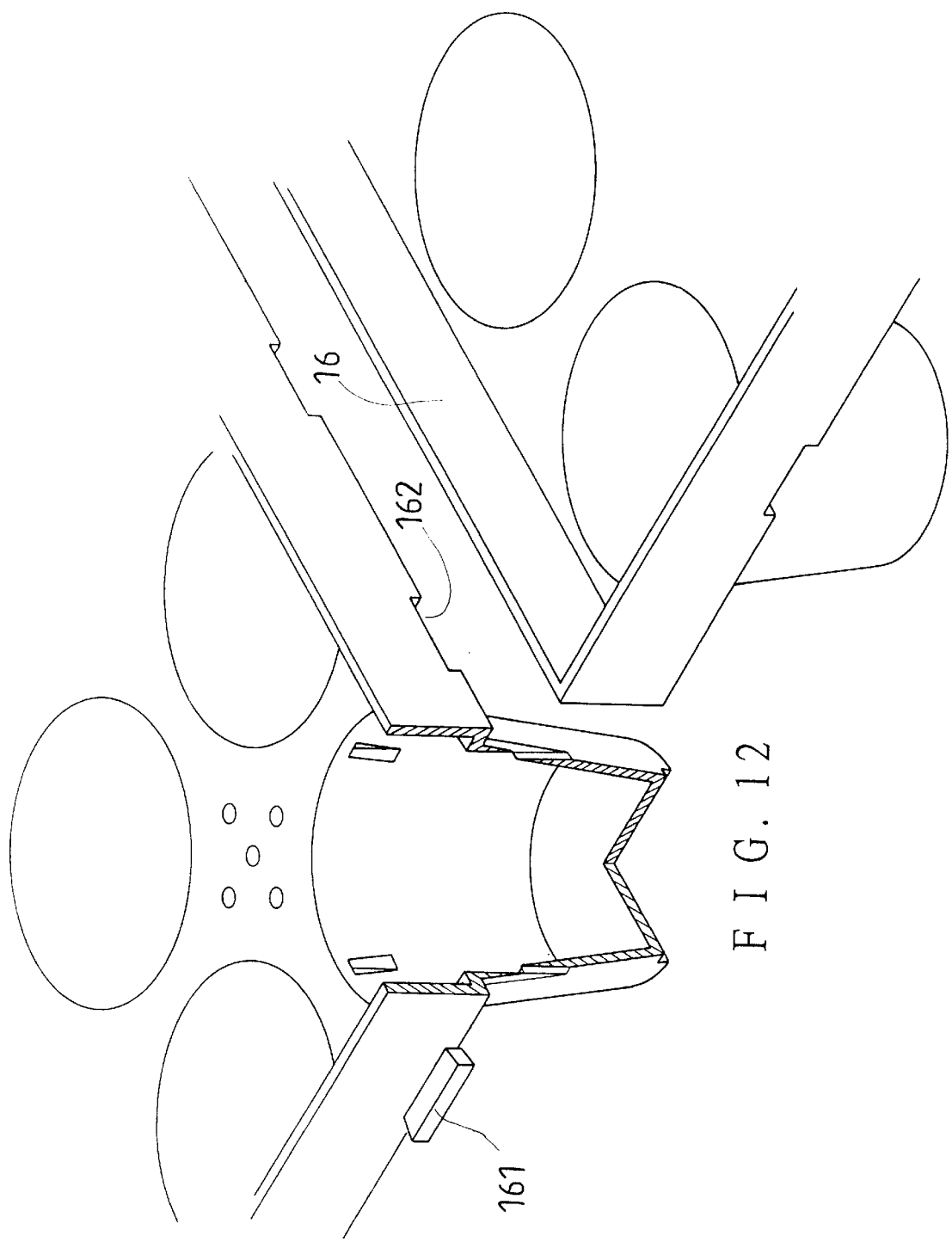
FIG. 12 is a perspective view of a second embodiment of a base of the present invention.
Figure 13:
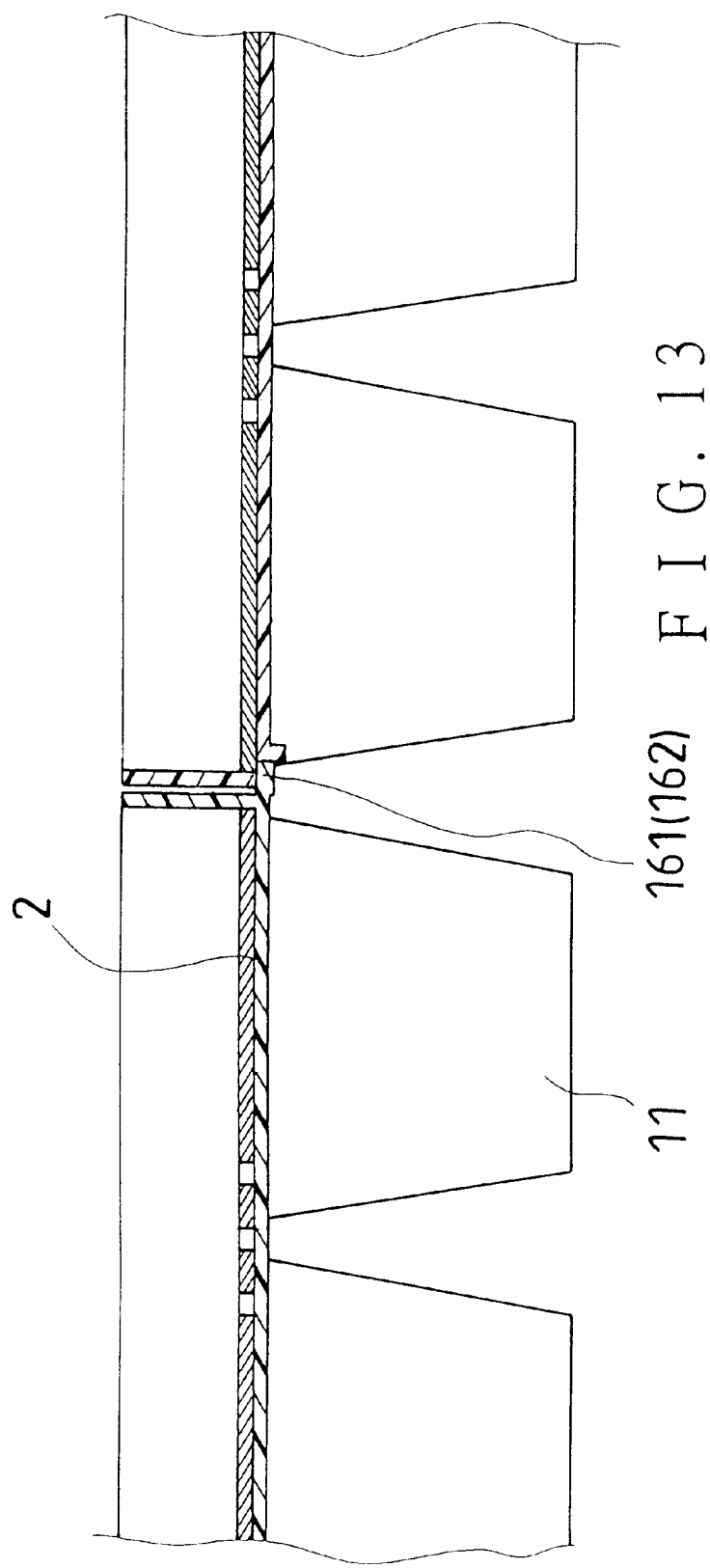
FIG. 13 is a side cross-sectional view of the second embodiment of the bases combined together of the present invention.
Figure 14:
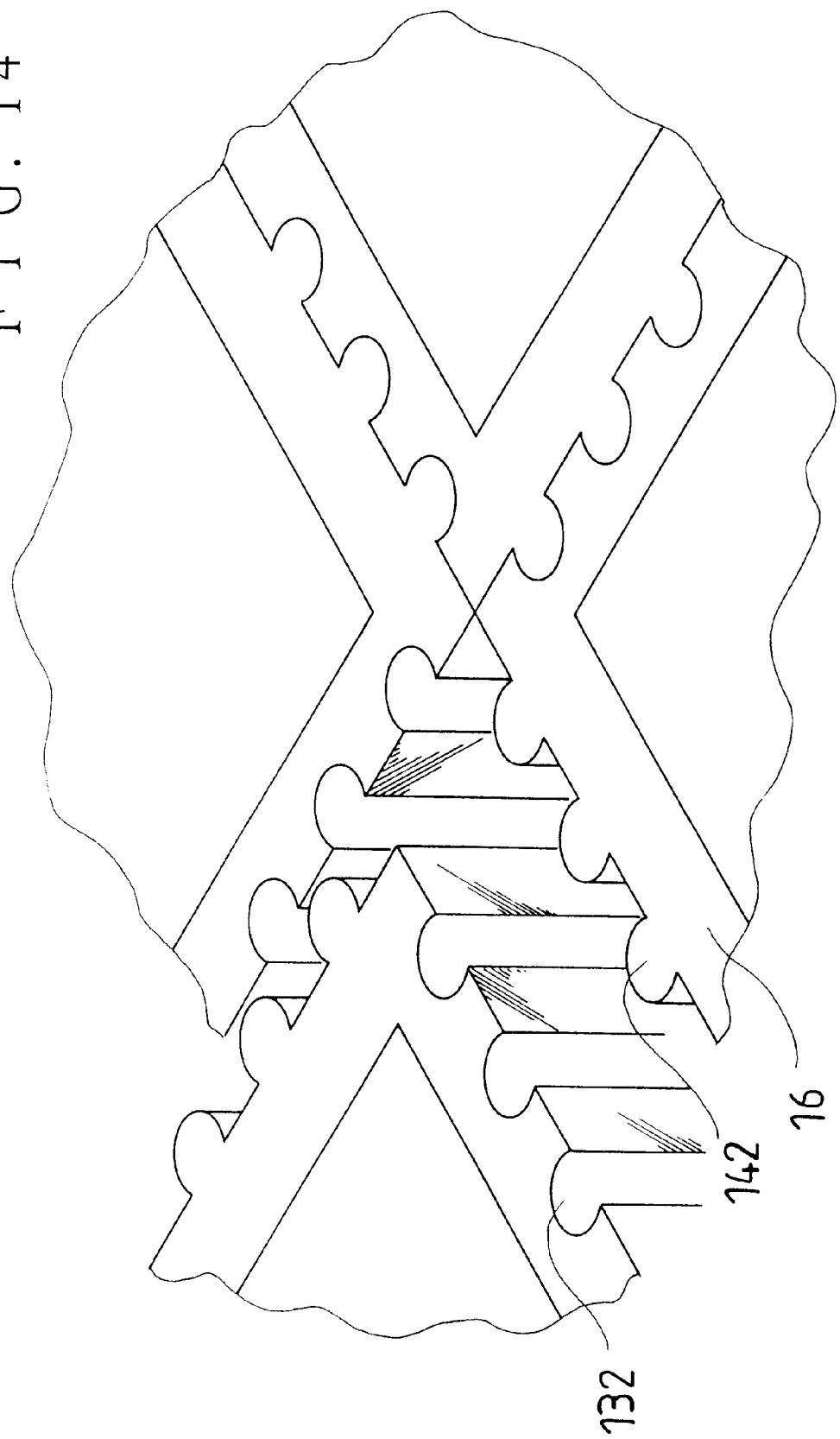
FIG. 14 is a first perspective view of a fitting structure of the second embodiment of a base of the present invention.
Figure 15:
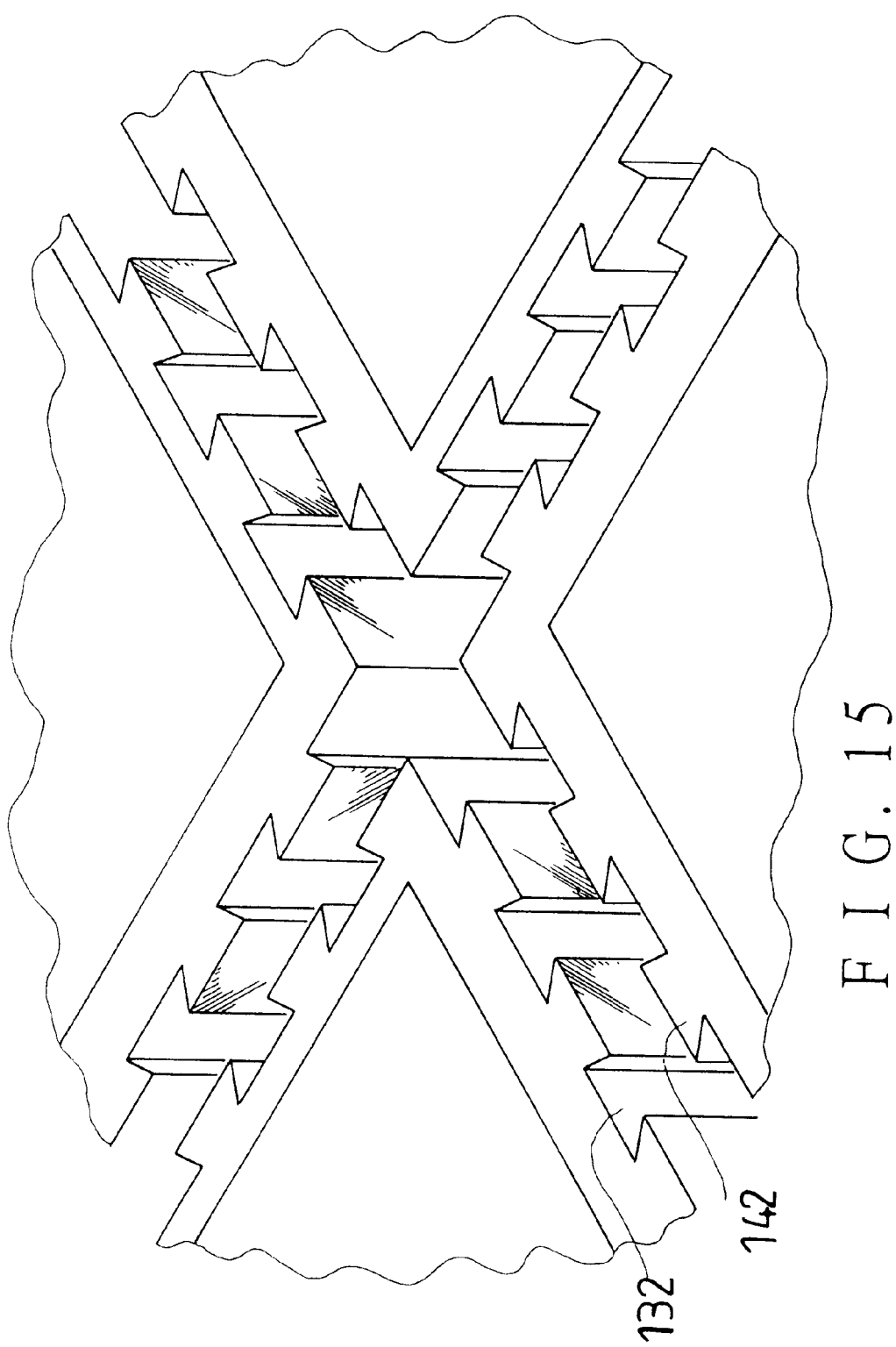
FIG. 15 is a second perspective view of the fitting structure of the second embodiment of a base of the present invention.

Next as shown in FIGS. 12 and 13, a second embodiment of a base of a planting plate of the invention includes a base 4 provided with a circumferential short wall 16 on an upper surface, and the circumferential wall 16 has a plurality of insert blocks 161 formed to project out from the outer bottom and a plurality of insert recesses 162 formed in the bottom surface to take place of the projecting studs 14 and the square rings 13 in FIG. 8. Further, the flat net plate serves a support plate 2, as shown in FIG. 10, to combine on the base 1, permitting roots of plants extend through the net holes down to suck water in the chambers 11 of the base 1. Furthermore, the circumferential wall 16 of the base can be made thick, and a plurality of insert blocks 142 and insert grooves 132 alternately formed vertically and spaced apart on an outer surface (a convex shape shown in FIG. 14 or a dove-tail shape shown in FIG. 15), and the planting plates may be combined together to increase its area by engaging the insert blocks 142 with the insert grooves 132, as shown in FIGS. 16 and 17.

Figure 18:
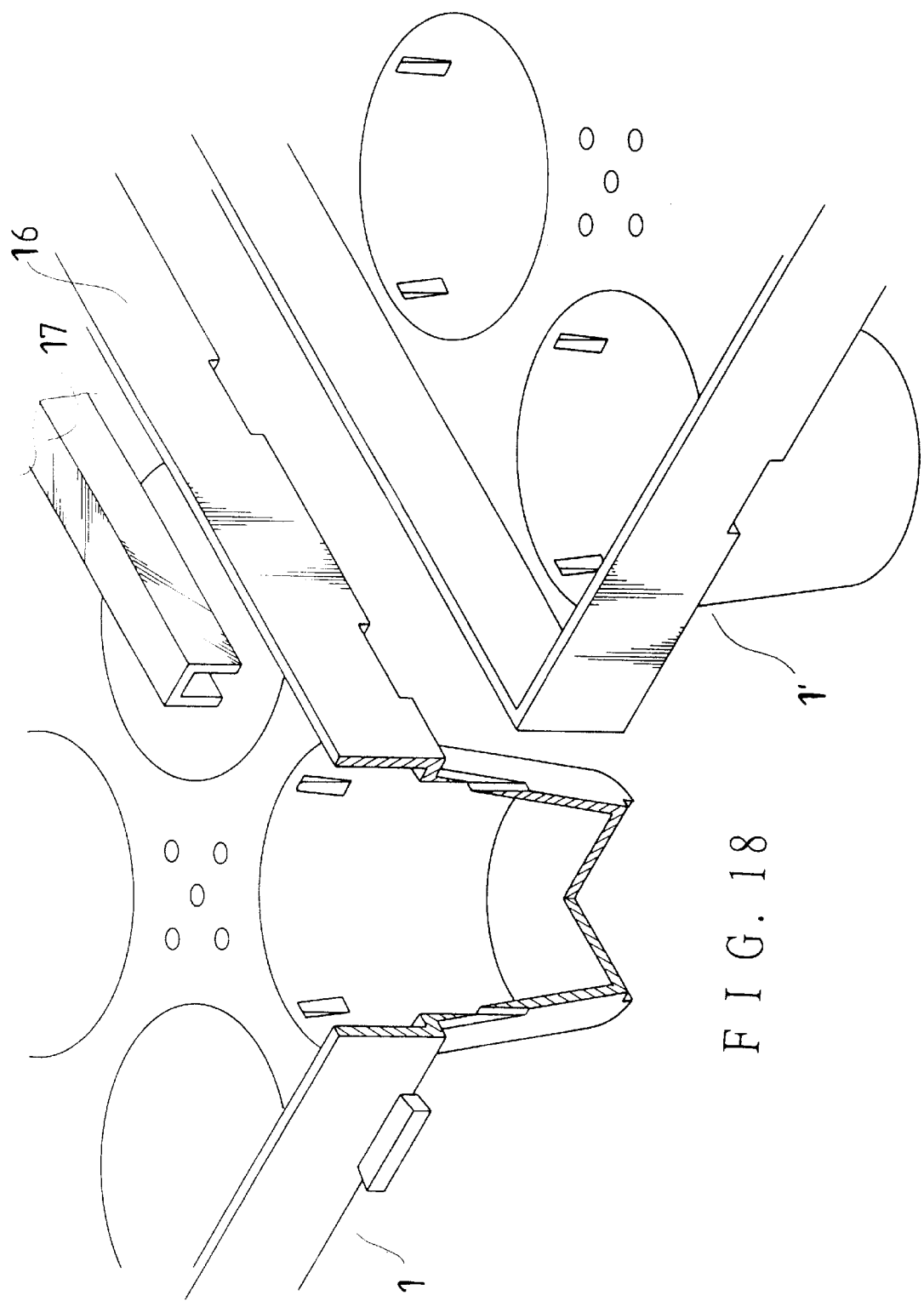
FIG. 18 is a perspective view of a third embodiment of a base of the present invention.
Figure 19:
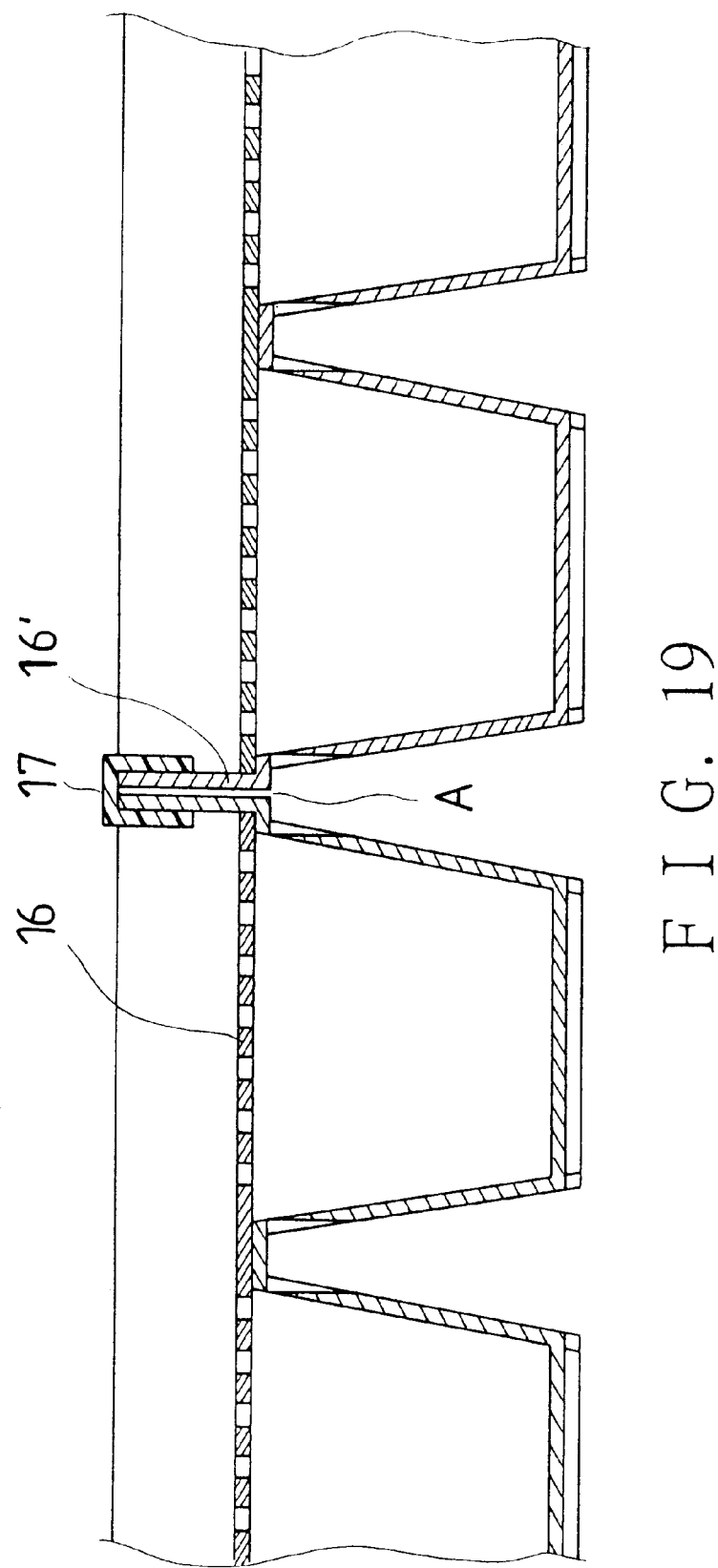
FIG. 19 is a side cross-sectional view of two bases of the third embodiment combined together of the present invention.
Figure 20:
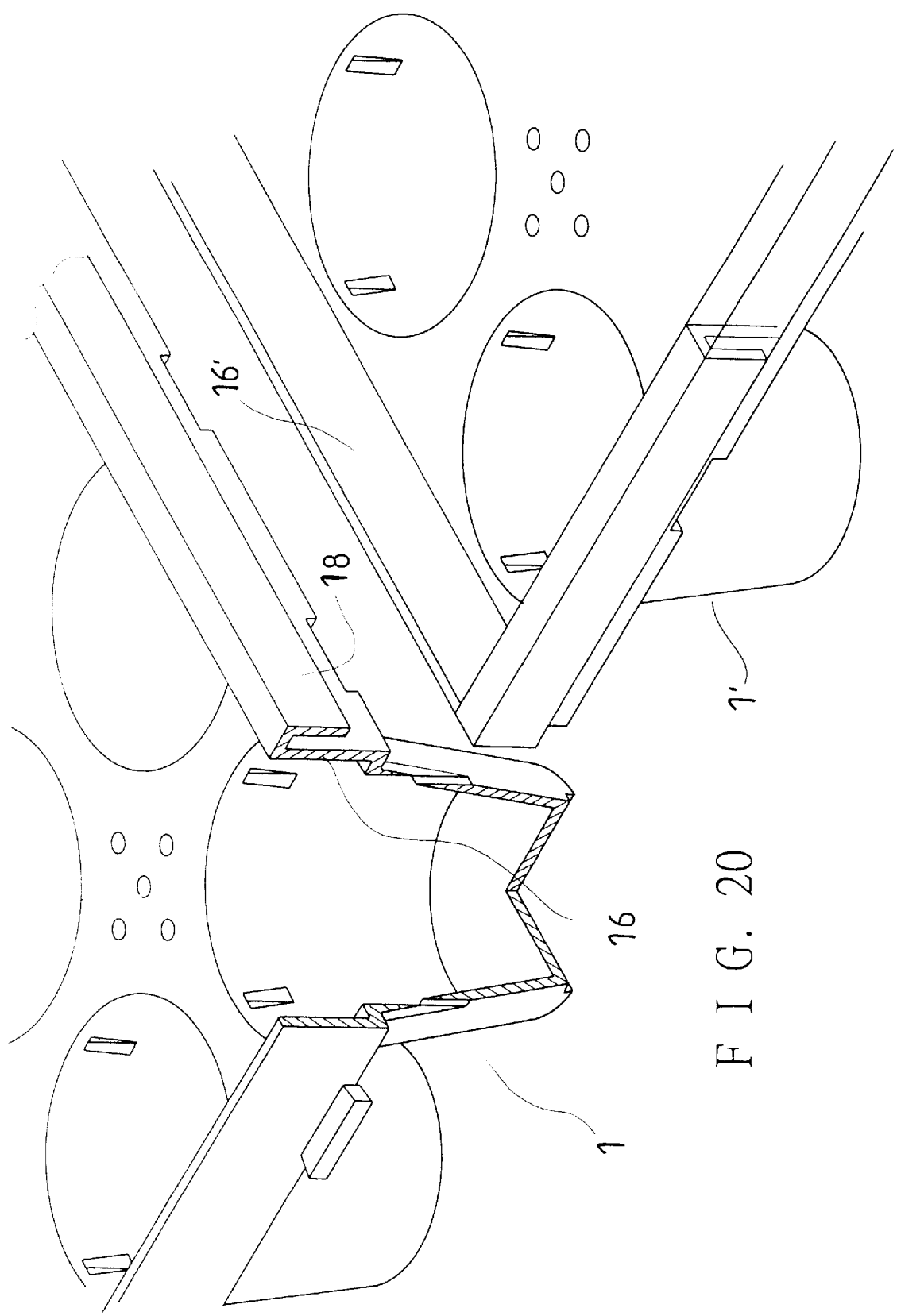
FIG. 20 is a perspective view of a fourth embodiment of a base of the present invention.

Furthermore, an inverted U-shaped combining strip 17 can be provided to match the circumferential wall 16 of the base 1 as shown in FIG. 18, striding on the tops of two circumferential walls 16 of two neighboring bases 1, as shown in FIG. 19, sealing gaps (A) between every two circumferential walls of two bases 1 and 1'. Then the soil in the planting layers 3 in the bases 1 may not fall down through the gaps (A), and besides, the combining strips 17 reinforce combination of the bases 1 and 1', striding tightly on and beside the circumferential walls 16 and 16'.

Figure 21:
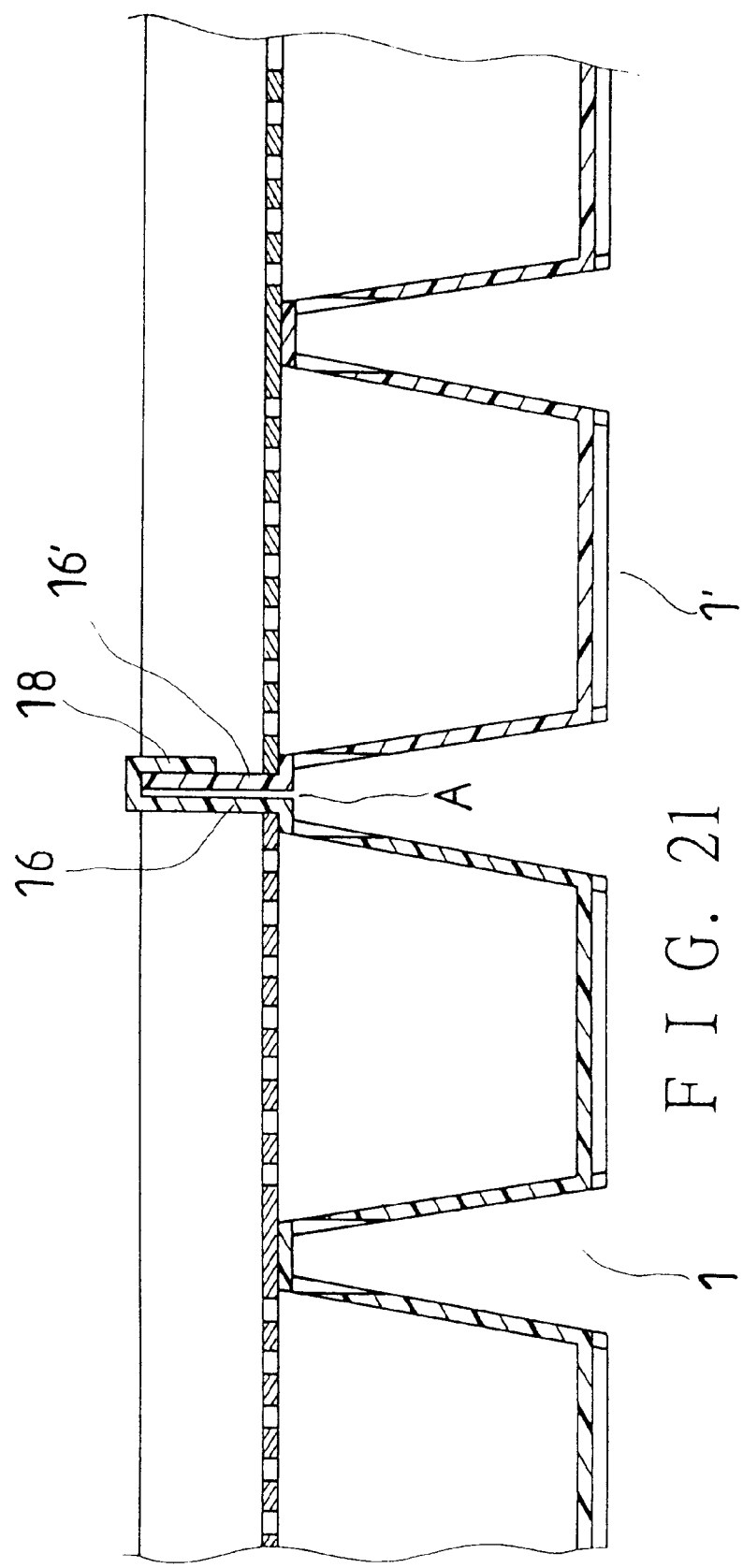
FIG. 21 is a side cross-sectional view of two bases of the fourth embodiment combined together of the present invention.

In addition, the circumferential walls 16 of two neighboring bases 1 and 1' may have an inverted U-shaped combining members 18 extending outward, so the inverted U-shaped combining members 18 stride on the circumferential walls 16' with no inverted U-shaped combining members 18, as shown in FIG. 21, sealing the gaps (A) between the two bases 1 and 1' to prevent the soil from dropping down, and besides reinforcing combining force of the planting plates.

The planting plate of the invention has the following advantages, as can be seen from the foresaid description.

1. It can be completely made beforehand at one place, and then transported to a site it is needed and combined one by one to suit to the area where plants are to be planted.
2. It is made completely at one place and then transported to a site for combining, so soil of the planting layer may not easily drop during transporting or planting process, possible to keep clean the site and clean easily.
3. It can be applied to a wide range of areas owing to possibility of combination, whether the area is large or small, and especially suitable for a small area in a room of a house.
4. Planting flowers can be easily changed owing to possibility of combining so as to plant flowers of the present season.
5. A user can alleviate psychological and physical burden in caring plants arranged in it, as the base and the support plate may naturally adjust water stored in them.
6. It is convenient for transporting by piling them up to save much space, as the base and the support plate have cup-shaped chambers and cone-shaped projections.
7. The gaps between the bases can be sealed by an inverted U-shaped combining strips striding on two circumferential walls of two neighboring bases, preventing the soil in the planting layers from dropping through the gaps. Then the soil dropping may not clog drain holes in the ground, and in addition, reinforcing combining force of combined planting plates.

What is claimed is:

1. A combinable planting plate comprising a base, a support plate and a planting layer, said base having a circumferential edge provided with a plurality of square rings and a plurality of combining studs formed spaced apart on said circumferential edge, more than two of said planting plate possible to be. combined with each other according to an area needed for planting, said support plate combined on said base, said planting layer deposited on said support plate for planting lawn, flowers, evergreens, a planting area made by combining needed number of said planting plates, and said planting plates possible to be changed at any time.

2. The combinable planting plate as claimed in claim 1, wherein said base is a plate of a preset size, having a plurality of cup-shaped chambers extending down from the plate and regularly arranged.

3. The combinable planting plate as claimed in claim 2, wherein said base has a plurality of cone-shaped projections instead of said cup-shaped chambers, and each said cone-shaped projections has a flat upper surface.

4. The combinable planting plate as claimed in claim 1, 2 or 3, wherein said base has a plurality of drain holes formed in an upper portion in said circumferential edge for excessive water to flow through and a plurality of insert holes for a separating plate to insert therein, and said support plate has a plurality of cone-shaped cups formed to extend down from an upper side and arranged regularly.

5. The combinable planting plate as claimed in claim 4, wherein said support plate has a flat net plate placed thereon instead of said cone-shaped cups.

6. The combinable panting plate as claimed in claim 4, wherein said base has a circumferential short wall on an upper surface, and a plurality of insert blocks formed to extend out and insert recesses formed in a bottom of said circumferential short wall, more than two said bases combined together to enlarge a planting area, and said support plate for matching said base with said wall is a flat net plate for roots of plants to extend down through net holes and suck water in said chambers of said base.

7. The combinable planting plate as claimed in claim 6, wherein inverted U-shaped combining strips are further provided for striding on and beside two said circumferential short wall of two neighboring bases for sealing gaps formed between said two circumferential short walls.

8. The combinable planting plate as claimed in claim 7, an inverted U-shaped combining wall is formed to extend up from two said circumferential short walls of two said bases, and said inverted U-shaped combining wall on strips two circumferential short walls without said inverted U-shaped combining walls of two said bases for sealing gaps formed between said two circumferential short walls of neighboring two said bases.

* * * * *